Oct. 17, 1961 R. J. BOYLE ET AL 3,004,829
HYDROGEN FLUORIDE PROCESS
Filed May 23, 1960
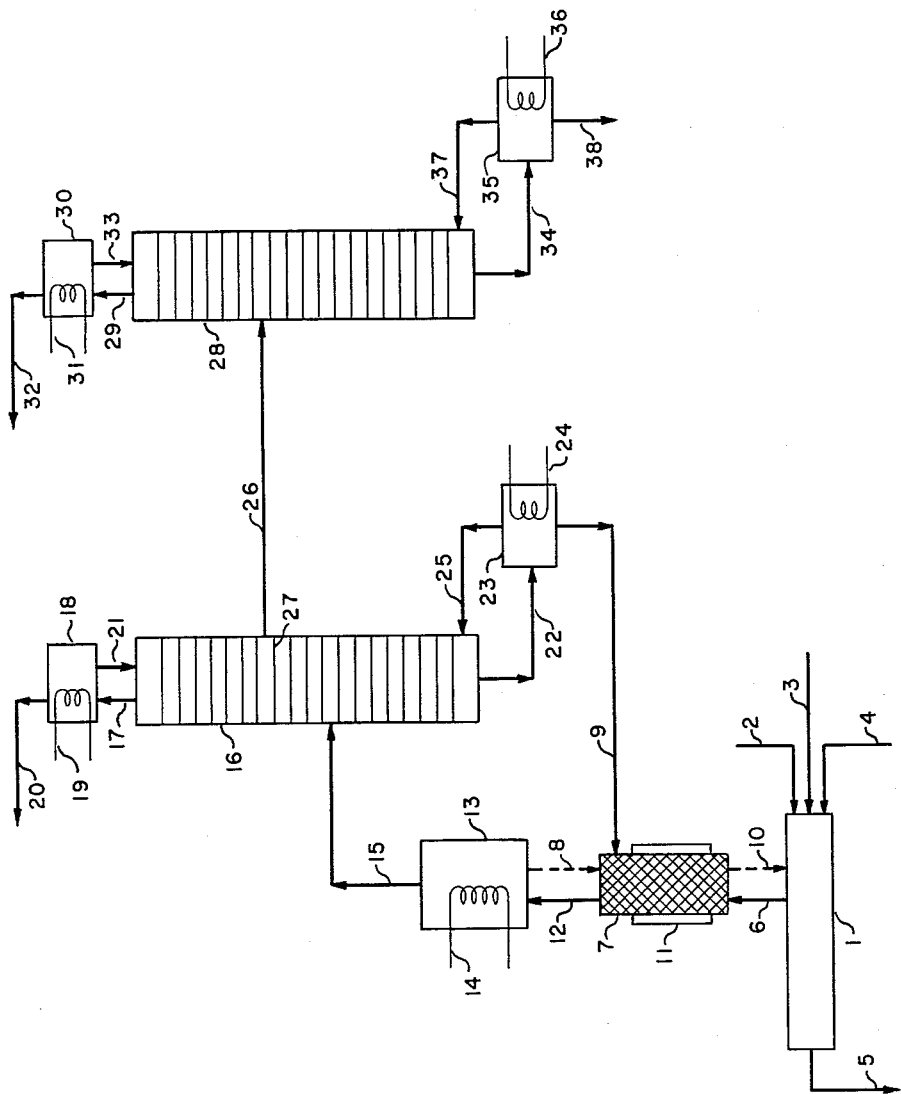
ROBERT J. BOYLE
GEORGE RUSSELL JAMES
*INVENTORS*
BY *J. T. Chaboty*
*AGENT*

United States Patent Office 3,004,829
Patented Oct. 17, 1961

3,004,829
HYDROGEN FLUORIDE PROCESS
Robert J. Boyle, Scotch Plains, N.J., and George Russell James, Armonk, N.Y., assignors to Chemical Construction Corporation, New York, N.Y., a corporation of Delaware
Filed May 23, 1960, Ser. No. 30,819
3 Claims. (Cl. 23—153)

This invention relates to the production of hydrogen fluoride. A new purification procedure has been developed which permits more efficient and economical production of substantially pure anhydrous hydrogen fluoride. Impurities are separated from the crude material by a novel distillation procedure, in which a liquid side stream from a first distillation stage is passed to a second stage for final purification. It has been found that a liquid side stream may be removed from the first stage substantially free of all impurities except sulfur dioxide.

The production of hydrogen fluoride involves a relatively simple chemical process. Dried and finely ground acid grade fluorspar is reacted with sulfuric acid to generate a crude hydrogen fluoride gas stream. Usually the reaction takes place in an externally fired rotary kiln. The crude gas stream is first passed through a filter to remove entrained dust and other solids. A typical filter unit is shown in U.S. Patent No. 2,088,048, however, in current practice the filter box is usually packed with coke rather than lump fluorspar. The coke box or other solids filter is generally irrigated with strong acid, usually recycle condensate to produce a scrubbing effect and thereby achieve the removal of acid mist as well as solids from the gas stream. A coke box filter unit is also shown in U.S. Patent No. 2,047,210.

The cleansed gas stream is now cooled to produce a partial condensation and water removal. The liquid phase may be recycled as mentioned supra. Then the gas stream is processed in a variety of ways to recover product hydrogen fluoride, with the particular procedure usually depending on the degree of concentration and purity desired in the final product.

In the present invention, a substantially pure and anhydrous product is produced by a unique distillation procedure. No external chemical dehydrating or purifying agents are employed. Although the broad concept of distillation as a means of hydrogen fluoride purification has been suggested in the prior art, such as the two patents cited supra, the distillation sequence in the process of the present invention possesses numerous advantages and remarkable effectiveness as compared to the procedures of the prior art.

The present invention involves a two-stage distillation sequence. In the first stage, the crude gas stream is fed to an intermediate level of a first distillation column. The gas stream is partially condensed and distilled, with inert and low-boiling gases rising through the gas phase to the top of the column and high boiling components such as water and sulfuric acid concentrating in the column bottoms. The top off-gas is refrigerated and refluxed, and a net inert gas fraction is discharged from the system. The aqueous bottoms are recycled to an earlier stage of the process, such as coke box scrubbing.

It has been found in the present invention that a hydrogen fluoride liquid phase may be recovered from a distillation stage above the crude gas inlet and below the off-gas reflux, which is substantially free of all impurities except sulfur dioxide. This liquid phase is then passed to a second distillation, in which sulfur dioxide removal is readily accomplished by a conventional distillation operation. A product consisting of substantially pure anhydrous hydrogen fluoride is thus recovered as column bottoms liquid phase.

The distillation sequence of the present invention possesses two major advantages over the prior art. First, the hydrogen fluoride is only condensed once, namely in the first distillation, since the process stream passes to the second distillation operation as a liquid and product is recovered as the liquid bottoms. This results in large power and heat savings. Second, inerts and low-boiling impurities are removed from the process stream in the first distillation and not carried into the second distillation. This results in important savings in equipment costs, since it permits the second column to be sized smaller than in prior practice because only sulfur dioxide has to be removed in the second distillation.

It is an object of the present invention to produce hydrogen fluoride from fluorspar and sulfuric acid more efficiently.

Another object is to produce substantially pure anhydrous hydrogen fluoride.

A further object is to purify hydrogen fluoride with an improved distillation procedure.

An additional object is to produce hydrogen fluoride free of sulfur dioxide, water and inert gases by distillation.

Still another object is to produce pure anhydrous hydrogen fluoride from an impure source by an improved and more economical two stage distillation process.

These and other objects and advantages of the present invention will become evident from the description which follows. Referring to the figure, rotary kiln 1 receives input fluorspar stream 2 and sulfuric acid stream 3. Usually only part of the sulfuric acid will be admitted via 3, with the balance of the sulfuric acid required being provided by oleum stream 4. Oleum is employed to react with and remove water from the system. Thus the oleum feed becomes hydrated to sulfuric acid and in turn also reacts with fluorspar feed 2.

The reaction produces solid calcium sulfate byproduct stream 5 as well as crude hydrogen fluoride gas stream 6. Byproduct stream 5 is usually discarded after liming. Crude product gas stream 6 passes upwards through packed coke tower 7, in which entrained solids and acid mist are removed by filtering and the washing action of recycle strong acid streams 8 and 9. The laden washing liquid stream passes downwards and back into reaction kiln 1 via 10, and thereafter the hydrogen fluoride content of stream 10 is again volatilized in kiln 1. Tower 7 is usually provided with cooling jacket 11, to achieve immediate cooling of the gas stream to a temperature level below the range of high corrosion rates.

The cooled and scrubbed gas stream, now free of entrained solids, leaves tower 7 via 12 and passes upwards into condenser 13 provided with cooling coils 14. Further cooling of the gas stream takes place in condenser 13, as well as condensation of strong aqueous hydrofluoric acid solution. The liquid acid solution is recycled from condenser 13 to tower 7 via 8, and is utilized as gas scrubbing liquor in tower 7.

The cooled gas stream 15 leaves condenser 13 at a temperature preferably between about 67° F. to 72° F., and will usually contain about 94% hydrogen fluoride. The balance of gas stream 15 consists of various impurities and reaction byproducts, including sulfur dioxide, water vapor, sulfuric acid, silicon tetrafluoride and inert gases such as nitrogen and carbon dioxide. Gas stream 15 now passes into distillation column 16, in which an extremely significant division of gas stream 15 is achieved. Gas stream 15 is condensed and distilled in column 16, in such a manner that inerts and low-boiling components such as nitrogen, carbon dioxide, silicon tetrafluoride and some sulfur dioxide pass upwards through the gas phase in the column and are eventually discharged in upper off-gas stream 17. Gas stream 17 is preferably withdrawn at a temperature between about 65° F. to 67° F. and of course consists mostly of hydrogen fluoride. However, the bulk of the aforementioned impurities is removed from the system in stream 17. Off-gas stream 17 is now chilled in cooler 18 provided with cooling and refrigeration coils 19, so as to condense essentially all of the hydrogen fluoride from the gas phase. The residual gas phase, consisting essentially of the aforementioned inerts and impurities, is discharged via 20. Liquid condensate, consisting of hydrogen fluoride slightly contaminated with sulfur dioxide, is recycled to the column via 21. It should be noted that a primary function of the upper plates in column 16 is to reheat stream 21 to a suitable equilibrium temperature within the column, prior to further processing.

High-boiling impurities, principally water together with a small amount of sulfuric acid, descend through the liquid phase in column 16 and are eventually withdrawn as column bottoms stream 22. Stream 22 is heated to a final liquid phase temperature preferably between about 70° F. to 75° F. in reboiler unit 23 provided with heating coil 24. Generated vapor phase is recycled to column 16 via 25, while the residual liquid phase consisting of a strong hydrofluoric acid solution containing water and a slight amount of sulfuric acid is recycled via 9 to tower 7 and is utilized as gas scrubbing liquor.

A liquid phase stream 26 is also withdrawn from a plate 27 located in column 16 above the point of entry of stream 15. This represents a most significant feature of the operation of column 16, since it has been found that liquid stream 26 derived as indicated from column 16 will consist of hydrogen fluoride substantially free of all impurities except for sulfur dioxide. Stream 26 is withdrawn at a temperature preferably between about 63° F. to 68° F. and will usually contain up to about 2% sulfur dioxide, with the balance of stream 26 consisting of hydrogen fluoride.

Stream 26 is now passed into second distillation column 28, wherein a conventional distillation-stripping procedure is employed to separate sulfur dioxide from the hydrogen fluoride product. Sulfur dioxide is concentrated towards the top of column 28 in the gaseous phase, and an off-gas stream 29 is withdrawn from the top of column 28 containing substantially all the sulfur dioxide originally introduced in stream 26. Gas stream 29 is cooled in cooler 30 provided with cooling coils 31, to condense hydrogen fluoride from the gaseous phase. The small residual gas stream, now consisting primarily of sulfur dioxide, is discharged from the system via 32. Condensed liquid consisting mostly of hydrogen fluoride is recycled to the top of column 28 via 33. The hydrogen fluoride is progressively stripped of its sulfur dioxide content as it passes downwards through column 28. A bottoms stream 34 is withdrawn and receives final purification in reboiler 35 provided with heating coils 36 and vapor return 37. A final liquid product stream 38 is withdrawn from reboiler 35. Stream 38 is substantially pure anhydrous hydrogen fluoride, with a maximum combined impurities content of less than 0.1%.

Numerous variations within the scope of the teaching of the present invention will occur to those skilled in the art. Thus the process of the present invention may readily be extended to the purification of, or recovery of anhydrous hydrogen fluoride from impure hydrogen fluoride streams which are generated or result from numerous chemical and metallurgical procedures. For example, the petroleum refining technique known as alkylation produces an impure hydrogen fluoride sludge acid which may be processed in accordance with the teaching of the present invention to produce a pure acid for further process usage.

*Example*

An example of the operation of the process of the present invention in hydrogen fluoride manufacture will now be described. The hydrogen fluoride generation kiln was charged with the following input feed streams:

| | Tons/day |
|---|---|
| Fluorspar (min. 97% calcium fluoride) | 5.86 |
| Sulfuric acid (min. 98%) | 5.37 |
| Oleum (20%) | 2.29 |

The crude hydrogen fluoride kiln off-gas was scrubbed and cooled in a coke box, further cooled in a refrigerated precooler, and then passed into the first distillation column at a temperature of 70° F. This feed stream analyzed 94% hydrogen fluoride. The column off-gas was removed at 66° F. and analyzed 96% HF, balance nitrogen and other inerts plus sulfur dioxide. The hydrogen fluoride content of the off-gas was recovered by chilling the gas stream to a final temperature of about −40° F. Recovered condensate consisting of hydrogen fluoride plus about 1% sulfur dioxide was refluxed to the column at a temperature of 0° F. This reflux stream was warmed to an equilibrium temperature on the upper plates of the column.

The column bottoms stream was reboiled and a net strong aqueous hydrogen fluoride solution containing a trace of sulfuric acid was recycled to the coke box at a temperature of 75° F.

A liquid product side stream was drawn off an upper plate of the column at 67° F. This side stream consisted of hydrogen fluoride containing only sulfur dioxide as a significant impurity. The stream analyzed 99% hydrogen fluoride, balance sulfur dioxide, and was passed to an intermediate plate of a second distillation column in which sulfur dioxide stripping was achieved.

The product stream was drawn off as the bottoms liquid from the second column reboiler, and analyzed within the following limits for AEC purity anhydrous hydrogen fluoride:

| | Percent |
|---|---|
| Minimum hydrogen fluoride | 99.90 |
| Maximum hydrofluorsilicic acid | 0.02 |
| Maximum sulfur dioxide | 0.01 |
| Maximum sulfuric acid | 0.005 |
| Maximum water | 0.05 |

This product was produced at the rate of 2.7 tons/day, hence the overall fluorine loss in the process of the present invention was about 6%. Thus the magnitude of process fluorine loss compares favorably with prior art operations.

Various alternatives in such procedures as process condensate recycle and initial solids removal from the crude gas stream will occur to those skilled in the art.

We claim:

1. Process for producing pure anhydrous hydrogen fluoride comprising reacting calcium fluoride and sulfuric acid, recovering an impure gas stream containing hydrogen fluoride together with entrained solids, mist, and gaseous impurities including water vapor, sulfur dioxide and inert gas, filtering and scrubbing said gas stream for solids and mist removal, cooling said gas stream to a temperature between about 67° F. to 72° F. whereby partial condensation results, recycling liquid condensate to said scrubbing, further partially condensing and distilling the residual gas stream in a first distillation zone to produce an overhead waste gas stream at a temperature between about 65° F. to 67° F. containing gaseous inerts, an aqueous liquid bottoms stream at a temperature between about 70° F. to 75° F. and an intermediate liquid process stream, cooling and refluxing said overhead gas stream to recover hydrogen fluoride content, discharging the residual inerts-laden gas stream, recycling said aqueous liquid bottoms stream to said scrubbing step, withdrawing said intermediate liquid process stream at a temperature between about 63° F. to 68° F. from a stage of said distillation step above the entry of said residual gas stream and below the recycle of overhead gas stream reflux whereby said intermediate liquid process stream is recovered substantially free of impurities other than up to about 2% sulfur dioxide, separately further distilling said intermediate liquid process stream in a second distillation zone to produce an overhead gas stream containing sulfur dioxide and a liquid bottoms stream, cooling and refluxing said overhead gas stream to recover hydrogen fluoride content, discharging the residual sulfur dioxide-laden gas stream, and recovering said liquid bottoms stream of pure hydrogen fluoride product and substantially free of sulfur dioxide and water.

2. Process of claim 1, in which at least a portion of said sulfuric acid is provided in the form of oleum, whereby substantially all water generated in the process is eliminated from the system by reaction with said oleum.

3. Method of obtaining substantially pure anhydrous hydrogen fluoride from an impure hydrogen fluoride gas stream containing water vapor, sulfur dioxide and inert gas as significant impurities which comprises cooling and partially condensing said gas stream by passing said gas stream to an intermediate feed level of a first distillation zone, cooling and refluxing the overhead gas phase from said first distillation zone to produce a final overhead waste gas stream at a temperature between about 63° F. to 67° F. containing said inert gas, heating and reboiling the bottoms liquid phase from said first distillation zone to produce a final liquid bottoms stream at a temperature between about 70° F. to 75° F. containing said water vapor as liquid water, withdrawing a liquid side stream at a temperature between about 63° F. to 68° F. from an upper level of said first distillation zone above said intermediate feed level, said liquid side stream comprising hydrogen fluoride substantially free of impurity other than sulfur dioxide, further purifying said liquid side stream by passing said side stream to an intermediate feed level of a second distillation zone, distilling said side stream, cooling and refluxing the overhead gas phase from said second distillation zone to produce a final overhead waste gas stream comprising sulfur dioxide, and heating and reboiling the bottoms liquid phase from said second distillation zone to produce a final liquid bottoms stream comprising pure anhydrous hydrogen fluoride substantially free of sulfur dioxide and water.

References Cited in the file of this patent

UNITED STATES PATENTS

| | | |
|---|---|---|
| 2,047,210 | Lawrence | July 14, 1936 |
| 2,088,048 | Bishop | July 27, 1937 |